United States Patent [19]

Fujimoto

[11] Patent Number: 5,088,025
[45] Date of Patent: Feb. 11, 1992

[54] INPUT/OUTPUT PROCESSOR CONTROL SYSTEM WITH A PLURALITY OF STAGING BUFFERS AND DATA BUFFERS

[75] Inventor: Akria Fujimoto, Conshohocken, Pa.

[73] Assignee: Unisys Corporation, Blue Bell, Pa.

[21] Appl. No.: 313,116

[22] Filed: Feb. 21, 1989

[51] Int. Cl.⁵ .................. G06F 13/36; G06F 13/38; G06F 13/40
[52] U.S. Cl. ............... 395/275; 364/240.5; 364/241.2; 364/251.3; 364/251.4; 364/247; 364/247.2; 364/238.3; 364/238.6; 364/239.7; 364/DIG. 1
[58] Field of Search ............... 364/200 MS, 900 MS

[56] References Cited

U.S. PATENT DOCUMENTS

| | | | |
|---|---|---|---|
| 4,567,560 | 1/1986 | Polis et al. | 364/184 |
| 3,731,002 | 5/1973 | Pierce | 179/15 AL |
| 3,733,593 | 5/1973 | Monar | 340/172.5 |
| 3,818,455 | 6/1974 | Brenski et al. | 340/172.5 |
| 4,314,328 | 2/1982 | Di Donato et al. | 364/900 |
| 4,325,120 | 3/1982 | Colley et al. | 364/200 |
| 4,484,273 | 11/1984 | Stiffler et al. | 364/200 |
| 4,509,142 | 4/1985 | Childers | 364/900 |
| 4,631,667 | 12/1986 | Zulian et al. | 364/200 |

Primary Examiner—Thomas C. Lee
Assistant Examiner—Daniel Pan
Attorney, Agent, or Firm—John B. Sowell; Mark T. Starr

[57] ABSTRACT

A control system for multiple channel data transfers between a main bus and a data bus is provided. A novel input/output processor control which permits multiple word transfers to occur in a single predetermined time slot while resolving buffer access conflicts and includes staging buffers coupled to the main bus and data buffers coupled to the data bus. A J-Bus is coupled between the staging buffers and the data buffers and is controlled by J-Bus transfer controller. A D-Bus transfer controller controls information transferred to an from the data bus and the data buffers. An M-Bus transfer controller controls information transferred to and from the staging buffers and the M-Bus. A controllable time slot generator in addition to generating the time slots for transferring information between the data buffers on the J-Bus also provides means for resolving conflicts between the J-Bus and the D-Bus and the M-Bus.

20 Claims, 9 Drawing Sheets

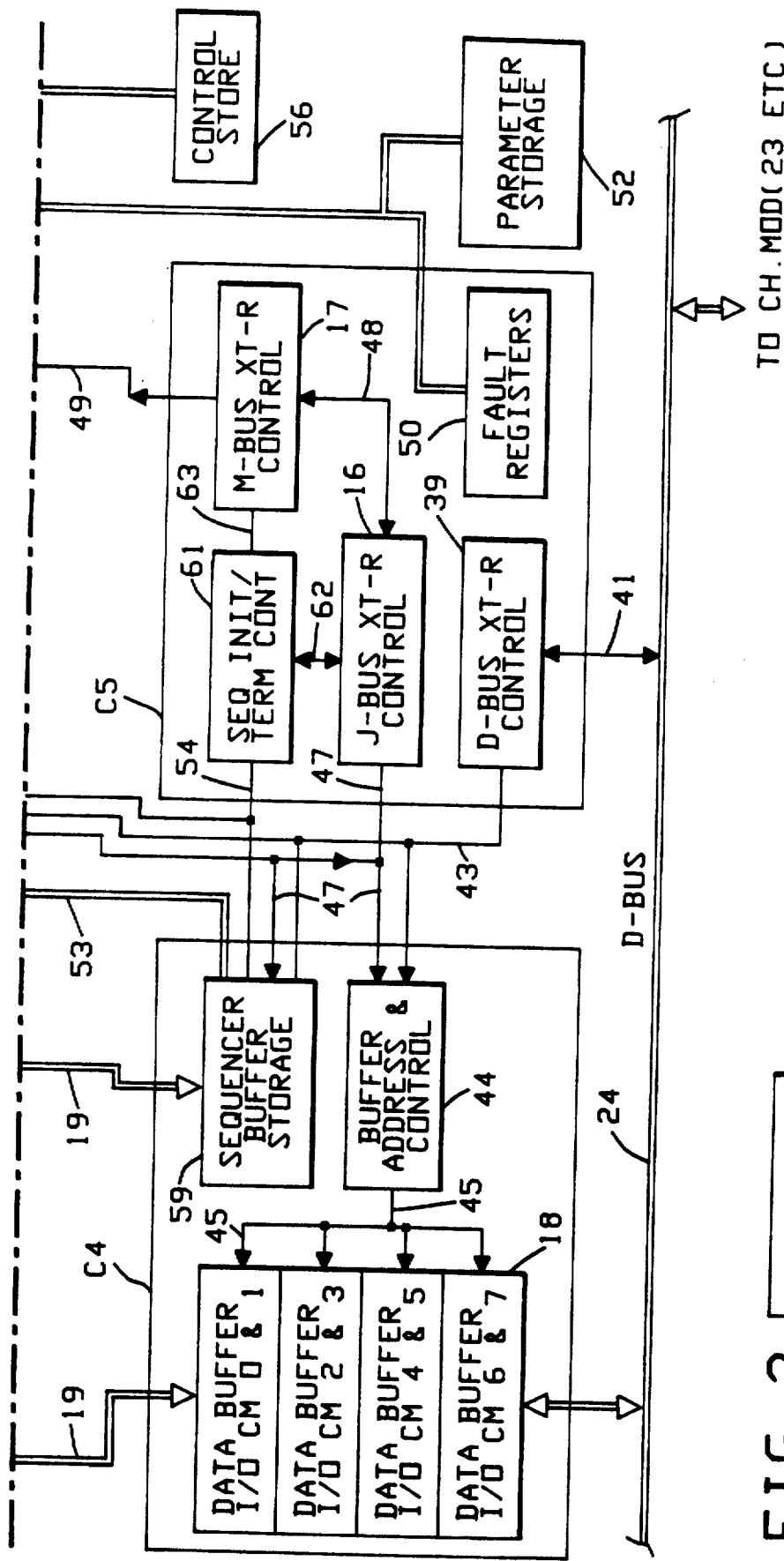

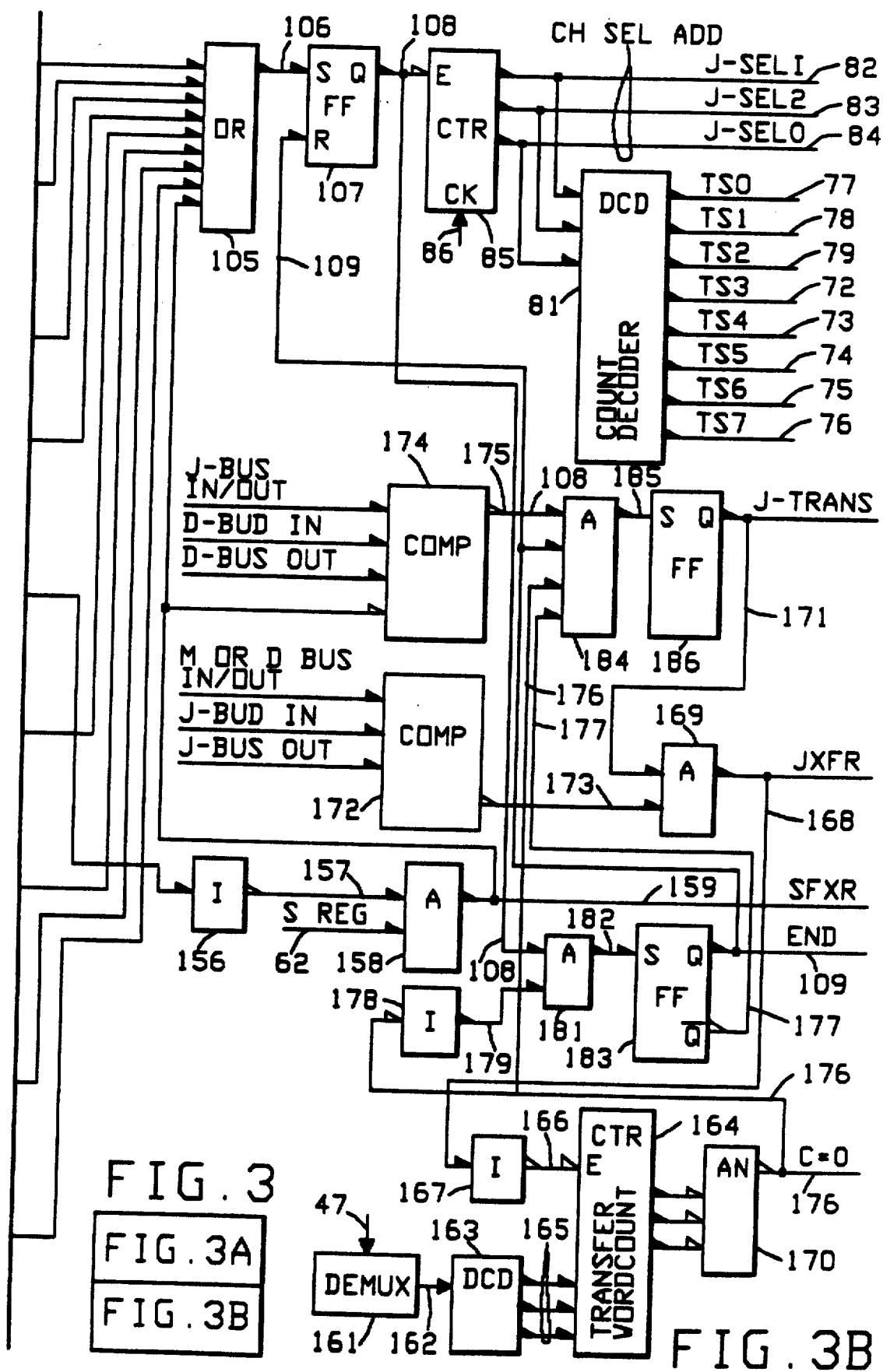

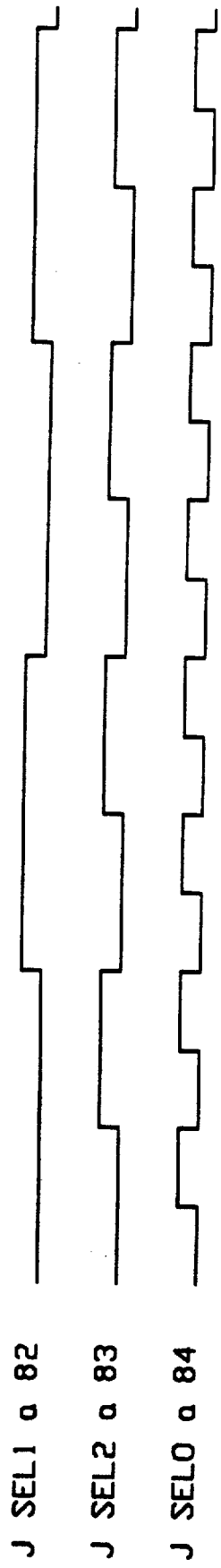

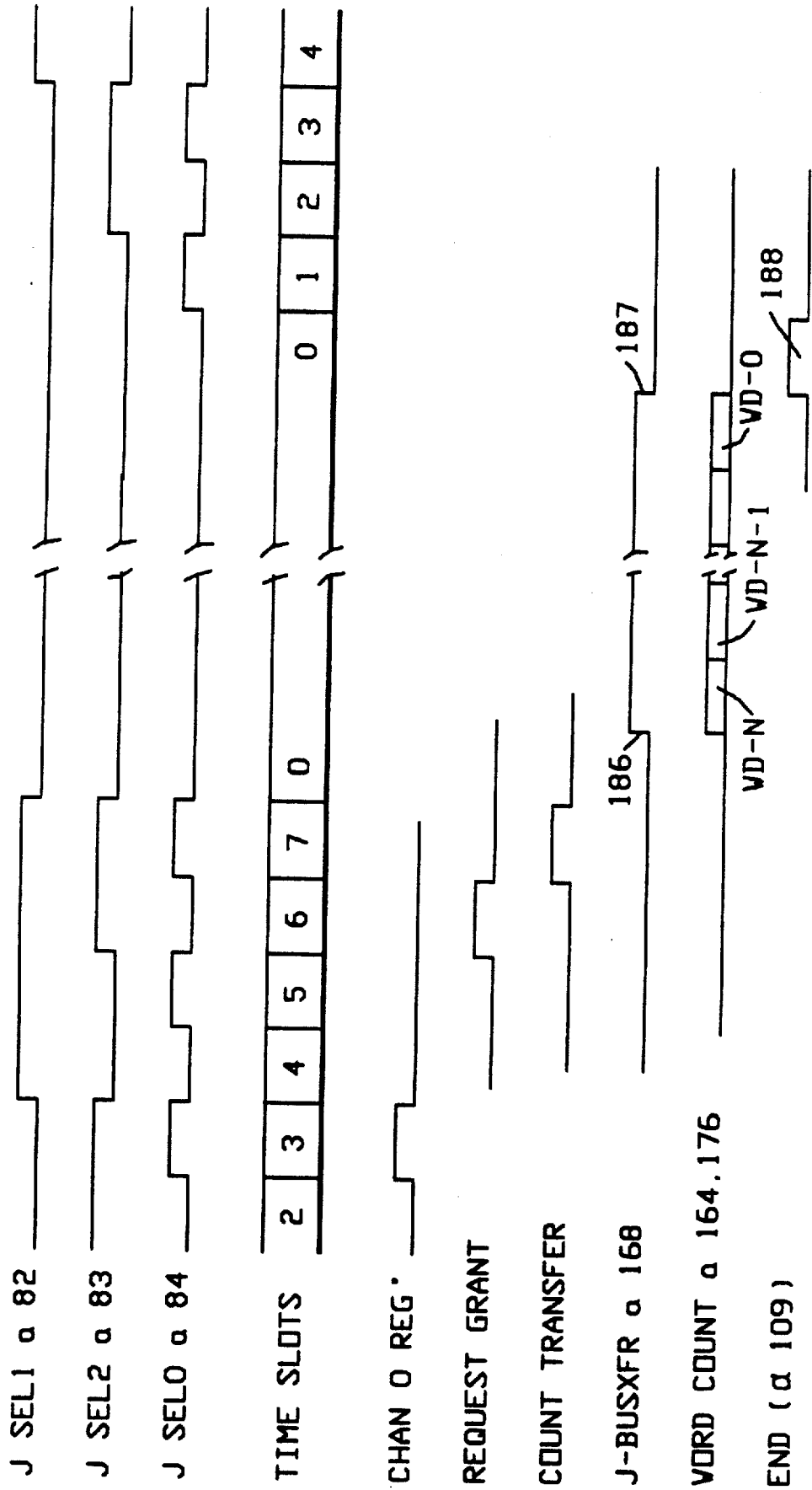

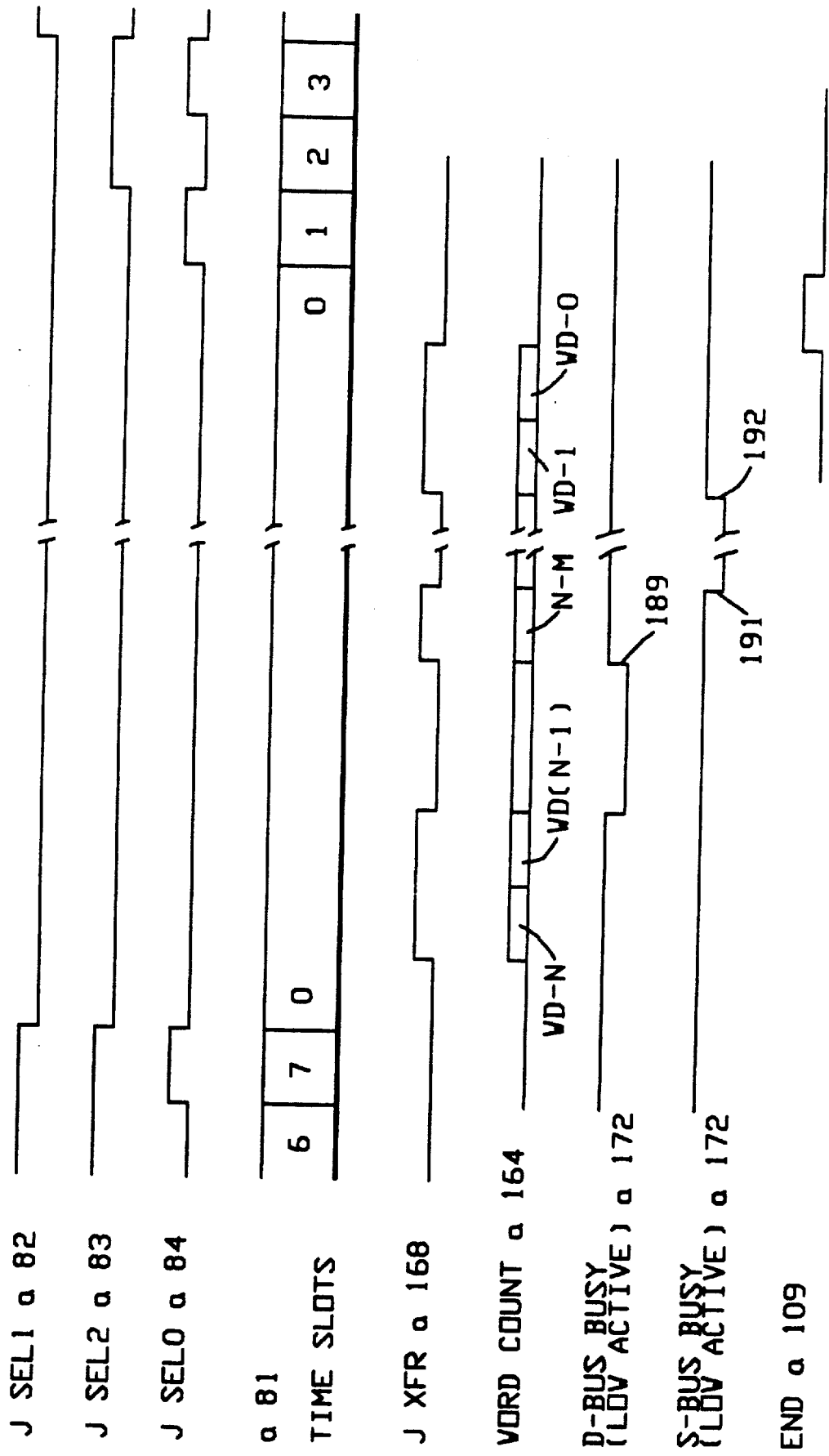

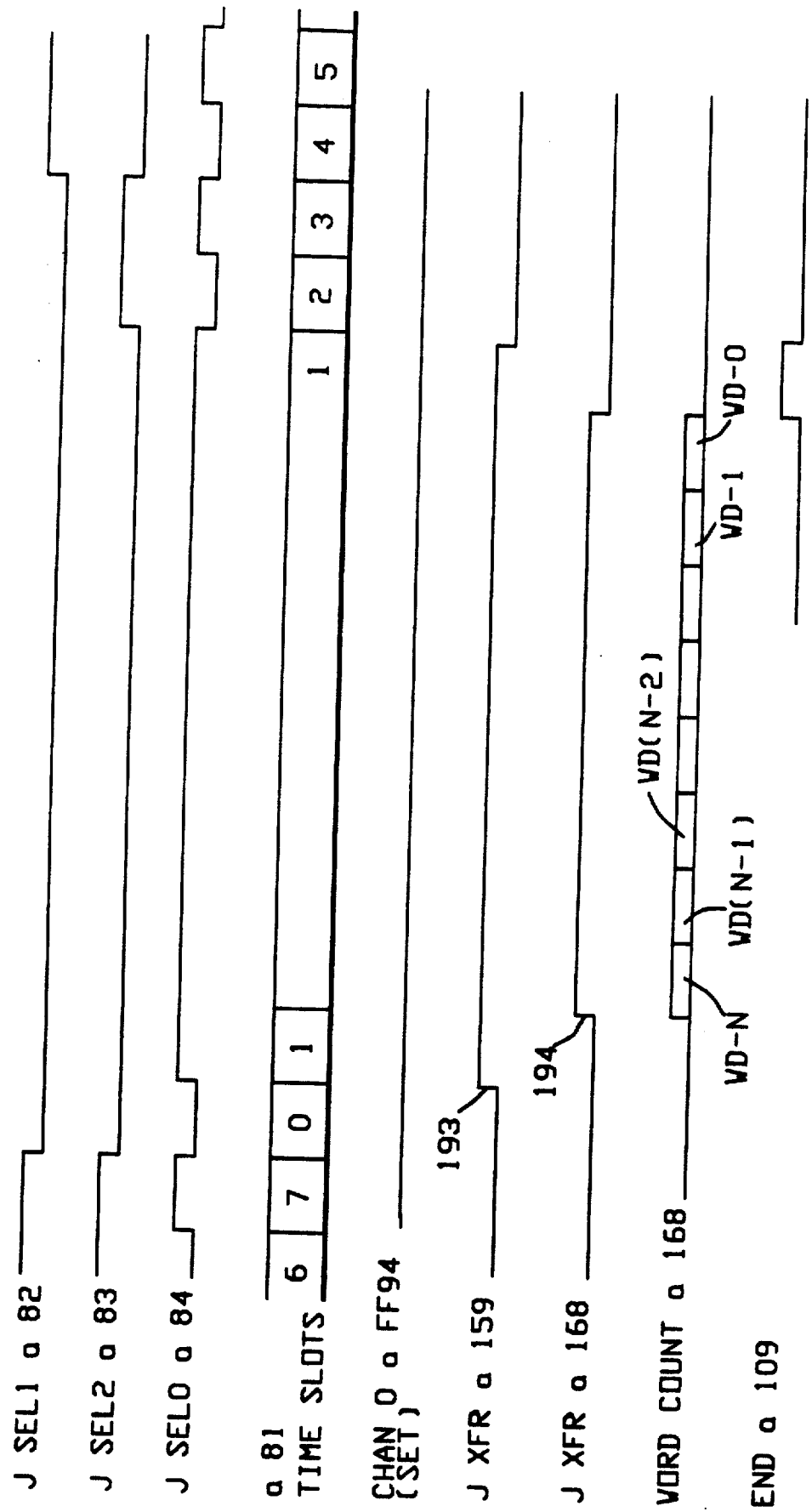

INPUT/OUTPUT PROCESSOR CONTROL SYSTEM WITH A PLURALITY OF STAGING BUFFERS AND DATA BUFFERS

BACKGROUND OF THE INVENTION

1. Field of the Invention

The present invention relates to a control system for multiple channel data transfers between buses in a processing system. More particularly, the present invention control system employs a controlled timed multiplexed data transfer system which permits multiple word transfers to occur in a single predetermined time slot while resolving buffer access conflicts.

2. Description of the Prior Art

Control systems for transferring data to and from main storage units (MSU's) and input/output (I/O) peripheral devices are well known. Such systems are classified in International Class GO6F 13/32 and in U.S. Class 364, Subclass 200. Requests for transfer of data can be routinely handled by settling priorities for each of the units or devices which may raise requests for transfer of data to another unit or device of the processing system.

One commonly known processing system is provided with a system bus (or main processor bus) to which the CPU (or CPU's) and main storage units (MSU or MSU's) are connected. In addition, the input/output peripheral devices (I/O's) are connected to a data bus (D-Bus). The control system for the transfer of data between the main bus (M-Bus) and the data bus may reside in an input/output processing system (IOP) connected between the two buses. As the computing system becomes larger and presumably faster no part of the control system is performed by the CPU or CPU's, but is performed by input/output processors (IOP's).

The function of the IOP's is to transfer data between the main bus and the data bus as efficiently as possible. When priorities are set for the channels attached to the data bus there is always a conflict between requests for access to the main system bus and the data bus which must be resolved by the control system.

It is a desirable feature of the present invention to provide an improved I/O control system which eliminates conflicts between requests from channels and I/O devices and does not delay or interfere with control data transfer signals.

SUMMARY OF THE INVENTION

It is a principal object of the present invention to provide a controlled time multiplexed data transfer system having a controllable time slot generator.

It is another principal object of the present invention to provide a plurality of data buffers servicing the D-Bus and a plurality of input/output staging buffers servicing the M-Bus, and a J-Bus and a J-Bus Transfer Controller for transferring data to and from said staging buffers and said data buffers.

It is another object of the present invention to provide an M-Bus transfer controller and a D-Bus transfer controller for transferring data between the M-Bus and the staging buffers, and the D-Bus and the data buffers independently of each other.

It is another principal object of the present invention to provide a novel time slot generator which generates a unique controllable time slot for each channel connected to the D-Bus.

It is another object of the present invention to provide a novel time slot generator which transmits the control perimeters to or from logic blocks during predetermined time slots or windows.

It is another object of the present invention to provide a control time slot generator that transmits different logic signals from different channels on the same control lines during different time slots associated with individual channels.

It is another object of the present invention to provide a controllable time slot generator for selecting a data buffer using a unique time slot or window.

It is another object of the present invention to provide a controllable time slot generator for selecting a data buffer, an input/output staging buffer, a transfer counter and a buffer counter.

According to these and other object of the present invention, there is provided an input/output processing system of the type having instruction processing means, and main storage means connected to a main bus and channel control module means associated with input/output peripheral devices which are connected to a data bus. A plurality of staging buffers are coupled to the main bus and a plurality of data buffers are coupled to the data bus. A J-Bus is connected to the staging buffers and to the data buffers for transmitting data between said buffers, and a J-Bus and J-Bus transfer control means are coupled to said buffers for effecting data transfer between said buffers on said J-Bus.

BRIEF DESCRIPTION OF THE DRAWINGS

FIGS. 2A and 2B comprise a block diagram showing the data transfer control functions of the controlled time multiplex data transfer system (CTS) for controlling the transfer of data between the M-Bus and the D-Bus employing a J-Bus and a J-Bus transfer controller;

FIGS. 3A and 3B comprise a block diagram of a controllable time slot generator of the type embodied in the J-Bus transfer controller of FIGS. 1 and 2;

FIG. 4 is a timing diagram showing timing slot assignments for some of the essential control signals for operation for the J-Bus;

FIG. 5 is a timing diagram showing timing of data word transfers occuring on the J-Bus;

FIG. 6 is a timing diagram showing timing of data transfers on the J-Bus and the resolution of accessing conflicts with the M-Bus and the D-Bus; and FIG. 7 is a timing diagram showing timing of data word transfers in response to a sequencer request.

DESCRIPTION OF THE PREFERRED EMBODIMENT

Figure 1:
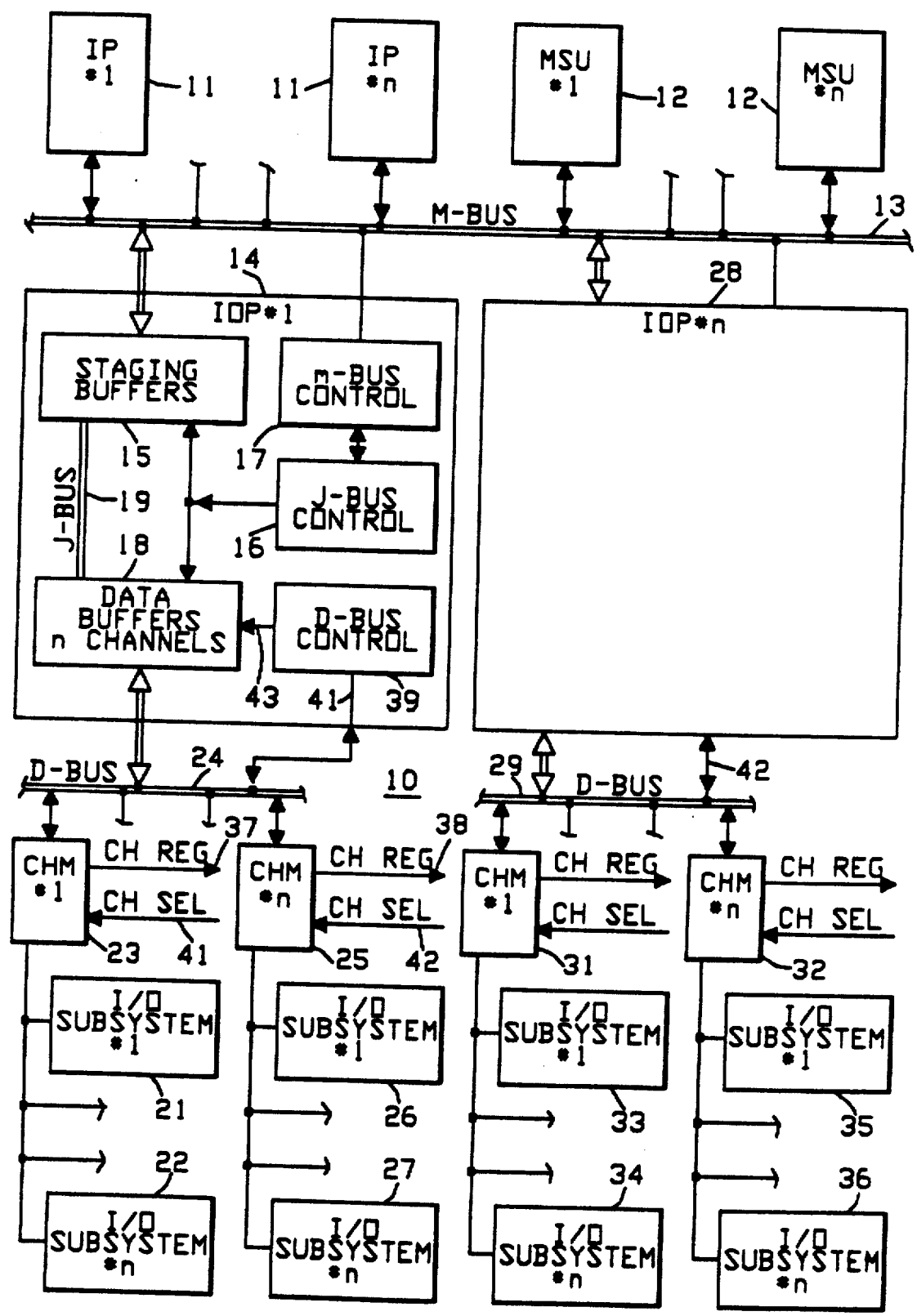
FIG. 1 is a block diagram of a part of a main frame computer system showing plural Interstruction Processes (IP's), Main Storage Units (MSU's) and I/O Processors (IOP's) connected to the main or M-Bus, and a plurality of I/O Channel Modules (IOCM's) connected to one of the IOP's via a data bus or D-Bus.

Refer now to FIG. 1 showing a block diagram of a part of a main frame computing system 10. The computing system comprises a plurality of instruction processors 11 and plurality of main storage units 12 each of which is connected to a main bus 13 for receiving and transmitting data as well as commands or messages. As is well known, the instruction processor 11 supplies commands or instructions to the main storage unit 12 and subsequently sends a message to the IOP 14 that there is a command in the MSU 12 to be executed. The sequencer (not shown) makes a request to the M-Bus control 17 to transfer the command in the MSU 12 to the staging buffer 15. A subsequent request from the sequencer 55 (shown in FIG. 2) to the J-Bus control 16 causes the command in the staging buffer 15 to be transferred to the sequencer storage buffer 59 for execution as will be explained hereinafter. The sequencer 55 initiates the I/O operations based upon the I/O command stored in the storage register 59.

Assume that the data which has been transferred to the data buffers 18 via the J-Bus 19 is to be transferred to one of the numerous I/O subsystems 21, 22 etc. via a channel module 23 and the D-Bus 24 where up to eight channels are associated with each D-Bus 24, 29 etc. For this purpose, a channel module N 25 and its associated subsystems 26 and 27 etc. are shown connected to the D-Bus 24. In the preferred embodiment to be explained hereinafter a dedicated data buffer 18 is associated with each of the channel modules 23, 25 etc.

Also in the preferred embodiment a second IOP 28 is shown connected to the same M-Bus 13 and is also connected to its own associated D-Bus 29 and the channel modules 31, 32 etc. and their associated subsystems 33 to 36 etc. as shown. It will be understood that as many as sixteen IOP's may be connected to the main bus 13 and each of the IOP's has its own dedicated D-Bus and its own channel modules connected thereto.

Assume that a message has been sent to one of the channel modules 23, 25 to initiate and I/O operation. When the channel module and its subsystem is ready to receive data, it initiates a channel data request on lines 37, 38 etc. which may be expressed by a three binary digit code unique to one of the eight channels 23, 25 etc. The channel data request is received at the D-Bus control 39 which selects one of the data buffers 18 and one of the channel modules 23, 25 etc. to enable the transfer of data to the I/O subsystem.

When data is being transferred from one of the I/O subsystems through a channel modules 23, 25 to the D-Bus 24, it is stored in one of the data buffers 18 under control of the D-Bus control 39. After raising a channel data request to the D-Bus control 39, the D-Bus control 39 selects one of the channels on lines 41, 42 etc. and selects one of the data buffers 18 via line 43.

Figure 2A:
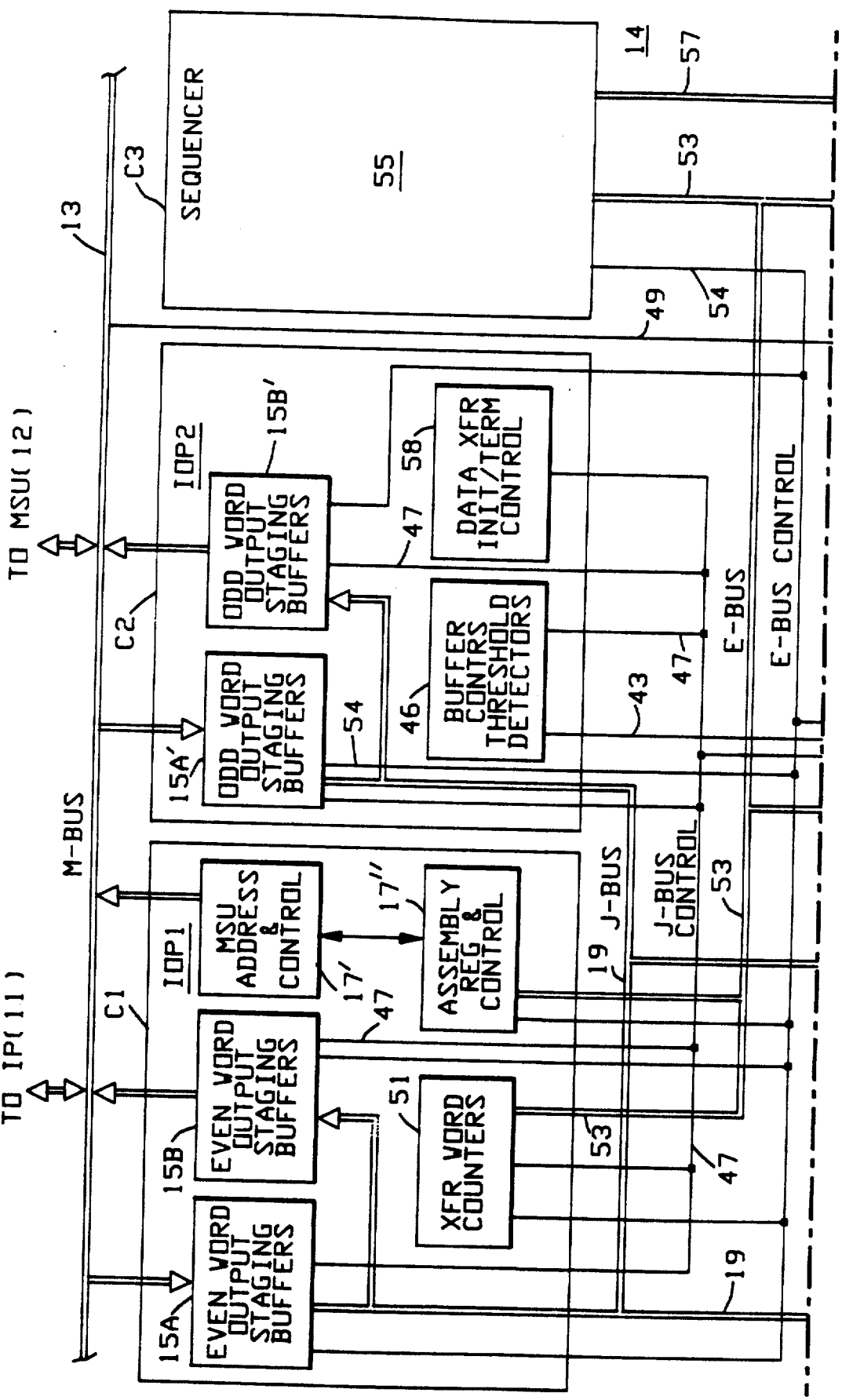

Refer now to FIGS. 2A and 2B showing greater details of the IOP 14 and the data transfer control functions of the control time multiplex data transfer system the IOPs 14 and 28 are implemented on boards comprising a plurality of individual VLSI chips C1 to C5 shown as individual blocks. For purposes of explaining the transfer control functions assume that an input data transfer function is to be accomplished. When an input data function is to be performed, information from the channel modules and their I/O subsystems is transferred to the D-Bus 24 by the D-Bus transfer controller 39. The D-Bus transfer controller 39 has raised the aforementioned channel select signal at the channel module and the data appears on the D-Bus at the input to the data buffers 18. The D-Bus transfer control line 43 is connected to a buffer address and control module 44 which selects one of the data buffers 18 via control lines 45 so that information on the D-Bus 24 is transferred into one of the aforementioned eight data buffers 18. The most efficient way to transfer data from the data buffer 18 to the M-Bus 13 is to accumulate a minimum of eight words in the data buffer 18 before attempting transfer. For this purpose, the control line 43 from the D-Bus transfer control 39 is connected to the buffer counters and threshold detectors 46. When the buffer counter 46 reaches a predetermined threshold, it raises a channel request on J-Bus control line 47 which connects to the J-Bus transfer controller 16. The J-Bus transfer controller 16 initiates a J-Bus transfer sequence which selects one of the data buffers 18 and also selects via control line 47 the even and odd word input staging buffers 15B and 15B, causing data to be transferred on the J-Bus 19 between data buffers 18 and input staging buffers 15B and 15B'. Once the information is transferred into the input staging buffers 15, the J-Bus transfer controller 16 initiates a control signal on line 48 to the M-Bus transfer controller 17, 17', 17' which raises a transfer control signal on its control line 49 causing the information in the input staging buffers 15B and 15B' to be presented on the M-bus 13 where it can be read into the main storage units 12.

Each time a word is transferred over the J-Bus 19, the J-Bus transfer controller 16 has selected one of the transfer word counters 51 which maintains a decrement count. Before the start of an I/O operation the number of words to be transferred during the entire I/O operation were transferred to the parameter storage 52 from the main storage unit 12 as previously described. For example, assume that a 1000 words were part of the commands stored in the parameter storage 52 and this information is supplied on the E-Bus 53 and set in the transfer word counters 51 under control of the E-Bus control line 54 as a function of the sequencer 55. The micro code for controlling the sequence of 55 is stored in control storage 56 and transferred via bus 57 to and from the sequencer 55.

At the same time information is being transferred from the data buffer 18 on the J-Bus 19, the buffer counters 46 are being decremented under control of control line 47 and the J-Bus transfer controller 16. The manner in which the threshold detectors associated with the buffer counters 46 operate is as follows: A predetermined threshold count is established for the initiation of transfer of data from a data buffer 18 to the input staging buffers 15. Data transfer on the J-Bus will not be started until the threshold is reached. When the threshold is reached, a channel request can be executed and the number of words to be transferred are presented on control line 47 to the J-Bus transfer controller 16 which will be explained in greater detail hereinafter.

Assume now as a second example that a channel module raises a request for output data from a main storage unit 12 and that the commands have already been transferred to the parameter store 52 and the sequencer 55, and the IOP 14 has sent an output command message to a channel module to initiate an output data operation. One of the channel modules 23, 24, 25 etc. can now raise a channel output data request to the D-Bus transfer controller 39 and the D-Bus transfer controller 39 selects the channel module and also selects the data buffer 18. Assuming that enough data is in the data buffer, it will be transferred via the D-Bus 24 through the channel module 23, 25 etc. to one of the I/O subsystems 21, 22 etc. When data is transferred out of the data buffer 18, the buffer counter 46 is decremented and automatically initiates a request on control line 47 to the J-Bus transfer controller 16 to load additional information from the main storage unit 12 into the output staging buffers 15A and 15A' so that additional information can be transferred on the J-Bus 19 to the data buffer 18.

As a further example, when a channel module is initiating a request for output data and the data buffer 18 does not have a sufficient number of words to make the D-Bus transfer, then the buffer counter threshold detector 46 raises a request on its control line 47 to the J-Bus transfer controller 16 and the M-Bus transfer controller 17 via line 48 to raise a request on line 49 to the MSU 12 to transfer additional information into the output staging buffers 15A, 15A' then via the J-Bus 19 to the data buffers 18. When information is transferred from the output staging buffers 15A, 15A' to the data buffer 18 via J-Bus 19, one of the buffer counters 46 is incremented for each word being transferred. In a similar manner, the transfer word counter 51 is decremented for each word that is transferred from the MSU 12 on the J-Bus 19 to the data buffers 18. At the end of transfer when the transfer word counter 51 reaches 0 and the buffer counter 46 reaches 0, the I/O operation is terminated by the data transfer initiate terminate control 58 which is connected by control line 47 to the buffer counters 46 and the transfer word counters 51. Fault register 50 is employed to store any data transfer errors detected.

As a further example, assume that an I/O operation is terminated and it is desirable to determine status. The status is stored in the parameter storage 52 and under control of the sequencer 55 the status is transferred via E-Bus 53 to the sequencer buffer 59. After the status is loaded in the sequencer buffer 59, the sequencer 55 via E-Bus control 54 can raise a J-Bus transfer request on control line 54 to the sequence initiate terminate control 61. A signal on control line 62 from the sequence initiate terminate control 61 initiates a J-Bus transfer control operation on line 47 which connects to the sequencer buffer 59 and to the input staging buffers 15B and 15B'. The status in the sequencer buffer 59 is transferred to the input staging buffers 15B and 15B'. When the information is stored in the staging buffers 15B, 15B', the sequencer 55 can then raise a M-Bus transfer control request through the sequence initiate control 61 which initiates a control signal on line 63 to the M-Bus transfer control 17. This signal raises a transfer control signal on line 49 to the M-Bus which causes the information in the input staging buffers 15B, 15B' to be transferred to the MSU 12. As previously explained with reference to FIG. 1, an I/O command, or an I/O order, stored in MSU 12 could be transferred to the sequencer parameter storage 52. The manner in which this is done is now apparent from the reverse operation of that explained hereinbefore. The command in the MSU 12 is first transferred to the output storage buffers 15A and 15A' then the command is transferred to the sequencer buffer 59 under control of the sequencer 55, the E-Bus 54, the sequence initiate terminate control 61, control line 62 and the J-Bus transfer controller 16 which causes the information in output staging buffer 15A and 15A' to be transferred via the J-Bus 19 to the sequencer buffer 59. Once the command is in the sequencer buffer 59, it can be transferred via the E-Bus 53 into the parameter storage 52 under the control of the sequencer 55.

Figure 3A:
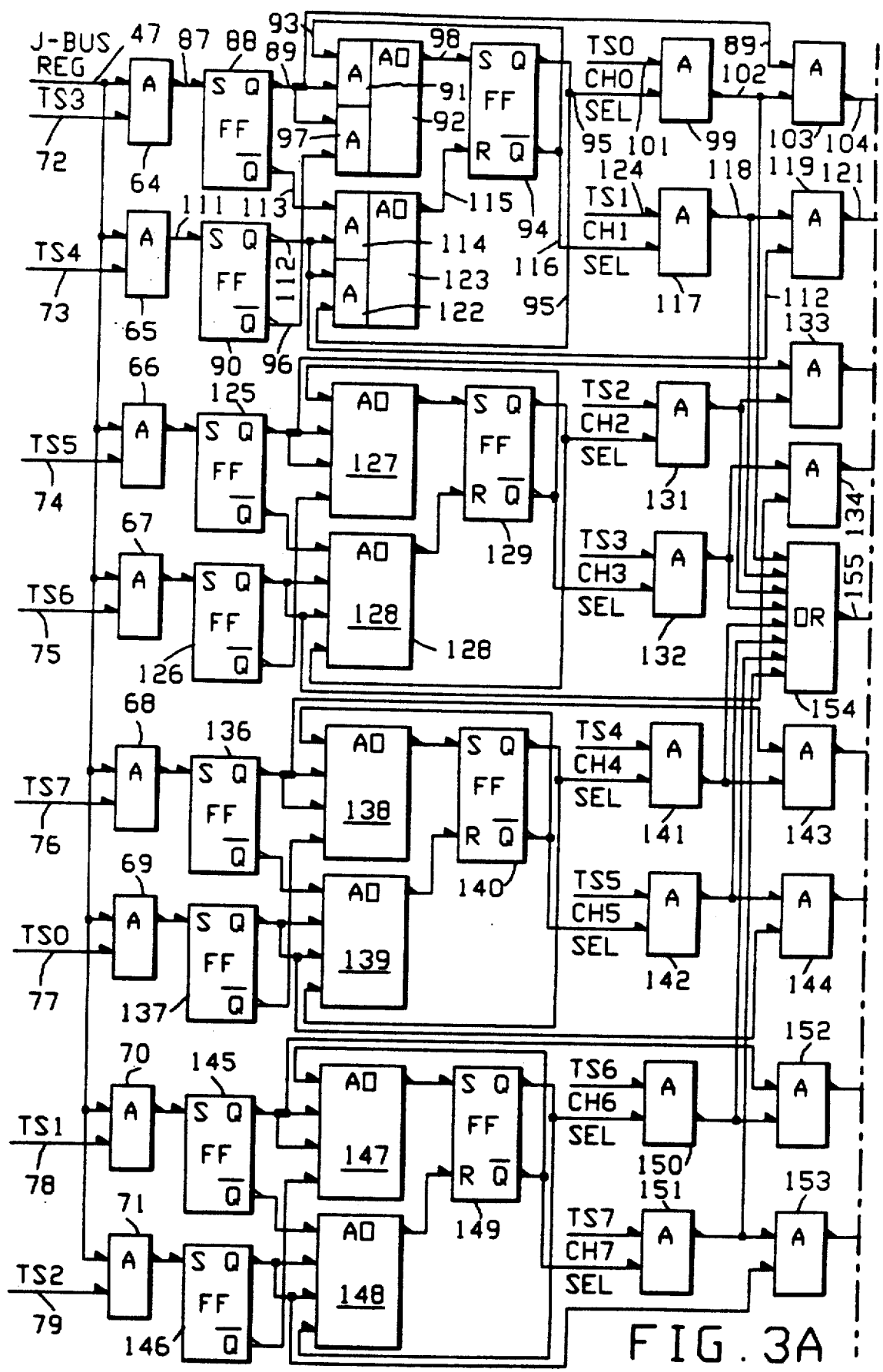

Refer now to FIGS. 3a and 3b which comprise a block diagram of the novel controllable time slot generator that is embodied into the J-Bus transfer controller 16. As previously explained with reference to FIG. 2 the buffer counter and threshold detector comprised a controller for raising J-Bus requests on control line 47. All J-Bus requests raised on line 47 are shown as an input to AND gates 64 to 71. Each of the AND gates 64 to 71 has a second input designated by the time slot sequence TS3 through TS7 and TS0 through TS2 indicated by lines 72 to 79. The time slot cells or divisions are generated at the output of count decoder 81 as a result of the 3 binary input lines 82 to 84 shown as J-Select 1, J-Select 2 and J-Select 0 which are outputs from the control counter 85. It will be understood that the time slots or cells T-0 through T-7 are occurring during each machine cycle and are clocked by clock pulses such as clock 86 shown as input to the control counter 85. For purposes of explaining the operation of the time slot generator, the time slot three (TS-3) on line 72 is employed to gate or de-multiplex channel 0 requests signals. Similarly, channel 1 requests are gated or de-multiplexed during time slot 4 as shown by the input on line 73. The output of AND gate 64 on line 87 is applied to the channel data transfer request flip-flop 88 which indicates that the channel 0 is making a request and causes the Q output on line 89 to go high. Assume that channel 1 data transfer request flip-flop 90 is in a reset condition indicating that there is no request from channel 1. The $\bar{Q}$ output on line 96 is high at the input of AND gate 97 which causes an output from OR gate 92 on line 98 to go high setting priority flip-flop 94 and generating a high output on line 95 from the Q-output of flip-flop 94. The channel 0 select signal on line 95 is applied to AND gate 99 and at the next following time slot 0 machine cycle time, which occurs on line 101, provides a high output on line 102 to the AND gate 103 which has a second high input on line 89 from the output of flip-flop 88 which generates a high output on line 104. The high output on line 104 passes through OR ate 105 and produces a high output signal on line 106 to the count hold flip-flop 107. The count hold flip-flop produces a high output on line 108 which is applied to the enable side of control counter 85. It will be noted that the open flag on line 108 indicates that the control counter 85 is disabled by a high signal and enabled by a low signal on line 108. The reason for disabling control counter 85 is to stop the generation of sequential time slot cells at output lines 72 to 79 until all of the information being transferred on the J-Bus has been transferred before resuming the time slot count. For this purpose, the reset signal on line 109 to the count hold flip-flop 107 resets and resumes the time slot count.

As will be explained in greater detail hereinafter, when the last word to be transferred during the channel 0 time slot TS3 has occurred, a high signal will be generated on line 109 which is applied as an input to the reset side of the count hold flip-flop 107 causing output line 108 to go low permitting the control counter 85 to resume its normal count. When the count resumes, the J-Bus request on line 47 can no longer be high at time slot TS3, which has just been completed, causing the output on line 87 from AND gate 64 to go low resetting the flip-flop 88. If during the interim period a J-Bus request on line 47 and a time slot TS4 signal on line 73 occurs at the input of AND gate 65, a high output on line 111 will be generated to the set side of flip-flop 90 causing the formerly reset flip-flop 90 to be set and to generate a high output on line 112. A similar high output is now present from the reset flip-flop 88 at $\bar{Q}$ output 113 causing the AND gate 114 to generate an output signal on line 115 to the reset side of priority flip-flop 94. When priority flip-flop 94 is reset, a high signal occurs at the channel 1 select line 116 and when time slot TS1 occurs as the second input to AND gate 117, a high signal occurs on line 118 as an input to AND gate 119.

The second high input on line 112 generates a high output on line 121 as an input to OR gate 105. The high output on line 106 from OR gate 105 to the hold flip-flop 107 now stops the generation of time slots until channel 1 has completed its transfer of information on the J-Bus as explained hereinbefore with reference to channel 0. In the same manner, the reset signal on line 109 is generated by the end count as explained hereinbefore after the transfer of a predetermined number of words up to eight words as will be explained.

As an example of resolving conflicts, assume that requests are raised by channel 0 and channel 1 at the same time and time slot TS3 occurs on line 72, then flip-flops 88 and 90 are sequentially set during time slots TS3 and TS4 respectively. To resolve the conflict assume that the priority flip-flop 94 is in the set condition indicating that channel 0 had last access to the J-Bus. When such condition occurs, the priority flip-flop 94 is set and a high output occurs on line 95 as an input to AND gate 122 and a high output is present on line 112 causing the output of AND gate 122 and OR gate 123 to occur as a high output on line 115. Flip-flop 94 is reset causing line 116 to go high and resolving the priority in favor of channel 1 select. When the next sequential time slot TS1 occurs on line 124 channel 1 becomes selected. It will be understood that flip-flops 88 and 90 in conjunction with the AND/OR logic gates 92 and 123 will condition the priority flip-flop 94 so that neither channel 0 or channel 1 can hold control of the J-Bus two consecutive times when the other channel has an active request.

In a similar manner, channels 2 and 3 raise their requests which are sensed during time slot TS5 and time slot TS6 on lines 74 and 75 at AND gates 66 and 67. In a similar manner, the channel 2 and channel 3 data transfer request flip-flops 125 and 126 sense the request and generate appropriate signals at the AND/OR gates 127 and 128 to either set or reset the priority flip-flop 129 so as to produce a high output signal on one of the outputs from flip-flop 129 to give priority to either the channel 2 or channel 3 select J-Bus signals shown as inputs to AND gates 131 and 132. During time slots TS2 and time slots TS3, the appropriate channel 2 or channel 3 select signal causes one of the AND gates 131 or 132 to generate a high signal from its AND gate as an input to AND gates 133 or 134 so as to generate a high signal input to OR gate 105 which will generate a high signal on line 106 to the count hold flip-flop 107 causing the appropriate time slot TS5 or TS6 to stay on hold until the transfer of all of the words set in the word counter 164 have been transferred as explained hereinbefore. At the end of transfer of the words on the J-Bus, an end signal on line 109 resets the count hold flip-flop 107 and the time slot generator and count decoder 81 resumes its count.

In a similar manner, channels 4 and 5 which utilize time slot TS7 and time slot TS0 on lines 76 and 77 have their flip-flops 136 or 137 set and reset, respectively, so as to generate output signals from either the AND/OR gate 138 or 139 to the priority flip-flop 140 which resolves the conflict between channels and permits either the channel 4 or the channel 5 select signal during time slot TS4 or time slot TS5 to pass through AND gates 141 and 143 or 142 and 144, respectively, to generate the high output signal on 106 from OR gate 105 as explained hereinbefore. In similar manner, gates and flip-flops 145 to 153 operate in a manner explained hereinbefore to select either channel 6 or channel 7 during their time slot TS6 or TS7 to effect transfer on the J-Bus.

As explained hereinbefore, only one of the AND gates 99, 117, 131, 132, 141, 142, 150 or 151 can have a high output signal at any particular time slot. The single unique high signal during each of the unique time slots is applied as an input to OR gate 154 to generate a high output on line 155. Only one of the two AND gates 99 and 117 may be high during time slot TS0 and time slot TS1. Similarly, during time slot TS2 and time slot TS3 only one of the outputs from AND gates 131 and 132 may be high. In similar manner, only one of the two AND gates 141 and 142 and 150 and 151 may be high during their respective time slot. In this manner, the inputs to the OR gates 154 are generating four active time slot active periods and four inactive time slot periods depending on the setting of the respective priority flip-flops 94, 129, 140 or 149. Rather than to waste the inactive time slots, a high inactive time slot time is generated on line 157 by inverting the output on line 155 inverter 156. During these inactive channel time slot times, a micro sequencer request on line 62 may be raised at AND gate 158 to affect a sequencer transfer signal on line 159 which is applied as an input to OR gate 105 that will set the count hold flip-flop 107 as explained hereinbefore and hold the time slot transfer time for the sequencer to transfer data.

When the number of words to be transferred on the J-Bus is complete, a word count reaches 0, generating an END signal on line 109 for the transfer of words on the J-Bus whether it is for channel transfer or micro sequencer transfer. The number of words to be transferred are generated at the buffer counter threshold detector control 46 as a signal on line 47 which is applied to a DEMUX selector 161 which generates a code signal on line 162. The signal is decoded in decoder 163 and jams a count into the transfer word counter 164 via lines 165. The word count is decremented by a word transfer signal on line 166 from inverter 167. A transfer word count signal on line 168 is shown as the J-Transfer signal which is generated at the output of AND gate 169 as a result of two inputs, one of which is shown as the J-Transfer signal on line 171 and the second input is from the output of comparator 172 on line 173. Comparator 172 will not permit a transfer on the J-Bus when either the staging buffers 115 or the data buffers 18 are having information transferred to or from their respective M-Bus and D-Bus's. For this purpose, the three inputs to comparator 172 are shown as M or D-Bus IN/OUT, J-Bus IN, and J-Bus OUT. The signal on line 173 is employed to suspend transfer of data on the J Bus and may be resumed whenever the conflict is resolved. Comparator 174 is provided to resolve conflicts which may arise initially with the D-Bus and the data buffers 18. If J-Bus information IN/OUT to the data buffers 18 is occurring at the same time the D-Bus IN or the D-Bus OUT is accessing the same data buffers via the D-Bus transfer controller 39, the J-Bus transfer signal on line 171 is suspended until the conflict is resolved. When no conflict occurs, a high output signal on line 175 occurs simultaneously with the high output signal on line 108 and the high output signals on lines 176 and 177. A high output signal occurs on line 176 when the counter 164 is not yet at the count of 0 when the signal on line 176 goes low. The signal on line 176 is applied to inverter 178 to produce a high signal on line 179. When the count goes to 0 the high signal on line 179 is applied to AND gate 181 which is enabled by the signal on line 108 to produce a high set signal on line 182 to the END count flip-flop 183 which produces the aforementioned end count signal on line 109. Until the end of the count and the occurrence of the END signal there is a high signal on line 177 which is applied to the AND gate 184 to produce a high signal on line 185 which is employed to set the flip-flop 186 and produce the J-Bus transfer signal on line 171 as explained hereinbefore.

Refer now to FIG. 4 showing a timing diagram of the time slot assignments for the central control signals for the J-Bus. The top three wave forms are generated at the upper right hand corner of FIG. 3 and show the encoded time slot signals on lines 82, 83 and 84 which drive the counter decoder 81 to generate the time slot signals designated as TS0 through TS7 which signals are transmitted to the logic and buffer controls explained hereinbefore with reference to FIG. 2. The upper most (or high portion) of the time slots wave forms are occurring at the output of the time slot generator 85 as inputs to decoder 81 and are the same count inputs which are provided at the buffer counter threshold detector control 46 and at the J-Bus transfer control 16 and at the left most input to the drawing shown as FIG. 3. The J-Bus request times are occurring between controller 46 and controller 16. During time slot TS0, a request for channel 5 can be raised and during the next sequential time slot shown as time slot TS1, a request for channel 6 may be raised. These request times are also shown at the left most input of FIG. 3. The J-Bus transfer controller 16 may then response with a "request grant". The request grant time occurs between controller 16 and controller 46 for channel 3 at time slot TS0 and for channel 5 at time slot TS2 etc. In similar manner, the count transfer which is transferred from the controllers 46 to the controller 16 occurs for channel 2 during time slot TS0 and for channel 5 during time slot TS3 etc. After the count transfer is made, it is possible to start the data transfer and for the channel which initiated the J-Bus request. During time slot TS0 transfer can be initiated for data transfer on J-Bus 19 for channel 0 and during time slot TS5 for channel 5 as illustrated by the bottom-most row on the timing diagram.

Refer now to FIG. 5 showing a timing diagram of data word transfer for channel 0. The time slots for transfer of data for channel 0 are shown in the fourth row and are generated by the three J Select 1, 2 and 0 signals on lines 82, 83 and 84 respectively, shown in Figure TS3. The channel 0 request is shown being raised during time slot TS3. Similarly, the request grant by controller 16 is shown being raised during time slot TS6. The count transfer from the controller 16 occurs during time slot TS7, thus, completing the necessary prerequisites for the transfer of data on the J-Bus. After allowing one machine cycle time which is shown on FIG. 5 as occurring during time slot TS0, the J-Bus transfer signal is raised on line 168 and at transition 186 of FIG. 5. As explained in detail hereinbefore, as long as the transfer word counter generates a word count (WD-N to WD-1) the signal on line 168 remains high until it reaches transition 187 at the end of word count 0 (WD-0) which causes the word counter 164 to generate signals coupled to NAND 178. The C=0 signal on line 176 causes line 176 to go low when C=0 as explained hereinbefore and the inverted signal on line 179 is employed to generate the END signal on line 109 shown at wareform 188. It will be remembered that the signal on line 109 is employed to reset the count hold flip-flop 107 which causes the count decoder 81 to resume the time slot counts.

Refer now to FIG. 6 showing a timing duagran of data transfer from the J-Bus and the resolution of accessing conflicts with the M and D-Bus's for channel 0. The time slot TS6, TS7, TS0 etc. are being generated at the output of counter decoder 81 as a result of the input signals on lines 82 to 84 as explained hereinbefore. When the J-Transfer signal on line 168 is first raised after the word count is stored in the counter 164, as shown in FIGS. 3 and 6, only two words, WD-N and WD-(N-1) are transferred before the D-Bus busy low active signal inside of comparator 162 goes low and suspends the transfer of word until transition 189 is reached and the conflict is resolved permitting the word transfer of word N-M to resume. FIG. 6 shows that only one word is transferred before transition 191 is reached when the M-Bus becomes busy and low active inside of comparator 172 again suspending the transfer of words until transition 192 is reached. The conflict is again resolved at transition 192 permitting the transfer of the last two words WD-1 and WD-0 to complete the transfer of words and the generation of the END signal on line 109 as explained hereinbefore.

Refer now to FIG. 7 showing a timing diagram of data words being transferred in response to a micro sequencer request. The time slots at the output of decoder 81 which are generated by the signals on lines 82 to 84 are shown in the first four rows of FIG. 7. The fifth row of FIG. 7 illustrates that the output of the priority flip-flop 94 is set showing that channel 0 is set or selected and channel 1 is inactive. The micro sequencer can raise an S-Transfer signal on line 159 as shown at transition 193 and can continue to transfer data on the J-Bus after waiting a machine cycle time and starting with the end of time slot TS1 as shown at transition 194 and continues to transfer words until the word counter 164 decrements to word count 0 which generates the C=0 signal on output line 176 and causes the END signal on line 109 to be raised as explained hereinbefore. After the END signal is raised on line 109 the time slot counter resumes its count permitting the transfer of information for the different channels on the J-Bus. It will be noted that when pairing channels there will always be four inactive time slots during a complete sequence of time slot counts so that the micro sequencer requests have a higher priority than the channels thus creating faster access to the J-Bus and enhancing the performance of the computer.

In addition to enhancing the performance of the computer by providing rapid access or faster access for the micro sequencer transfer of information to the sequencer buffer storage 59, the novel time slot generator permits the optimum petitioning of the required data transfer control logic into very large scale integration devices which also operate at high transfer speeds.

Having explained how the time slot generator is employed to implement the transfer of control logic signals during predetermined time slots it will be understood that fewer control lines and fewer access pins are required for the very large scale integrated devices in which the logic is implemented. Further, the novel time slot generator provides an efficient data transfer to or from multiple I/O channel modules without the possibility of conflict or interference between channels and data being transferred to the data buffers from the M-Bus and the D-Bus.

Another feature of the present invention is that multi-word transfers may be implemented during a signal time slot while the time slot generator holds the time slot count.

Another feature of the present invention is that the novel time slot generator logic circuitry automatically resolves buffer access conflicts with time slots multiplexing. While there is no fixed timing for the M or D-Bus, all conflicts at the staging buffers 15 and data buffers 18 are resolved at the J-Bus level. A feature of the present invention is that the I/O channel module request for data transmition on the J-Bus all have equal orders of priority because of the time slot generation and the priority logic of FIG. 3.

What is claimed is:

1. An I/O control system of the type having instruction processing means and main storage means connected to a main bus, and control channel module means associated with input/output devices connected to a data bus, the improvement comprising:
   a modular input/output processor connected between said main bus and said data bus having:
   a plurality of staging buffers coupled to said main bus and adapted to receive data from and transmit data to said main bus,
   main bus transfer control means coupled to said main bus for receiving request to transfer data to or from said staging buffers,
   a plurality of data buffers coupled to said data bus and adapted to receive data from and transmit data to said data bus,
   data bus transfer control means coupled to said data bus for receiving request to transfer data to or from said data buffers,
   a J-Bus connected to said staging buffers and to said data buffers for transmitting data between said buffers,
   a sequencer storage buffer connected to said J-Bus,
   said J-Bus being connected to said staging buffers and to said sequencer storage buffer for storing micro sequencer control data, and
   J-Bus transfer control means coupled to said data buffers, and staging buffers and to said sequencer storage buffer for effecting data transfer between said buffers.

2. An I/O control system as set forth in claim 1 wherein said J-Bus transfer control means comprises a controllable time slot generator.

3. An I/O control system as set forth in claim 2 wherein said controllable time slot generator includes data transfers sequence initiate/terminate control means.

4. An I/O control system as set forth in claim 3 wherein said sequence initiate/terminates control means is adapted to initiate, pause, continue or terminate a sequence of operations on said J-Bus when transferring data between said buffers.

5. An I/O control system as set forth in claim 2 wherein said controllable time slot generator further includes a counter decoder having a plurality of individual outputs each defining a unique time slot window (TS-N).

6. An I/O control system as set forth in claim 5 wherein said counter decoder is coupled to and driven by a control counter, and
   means for disabling and for enabling said control counter and for maintaining a desired time slot over a plurality of machine cycles.

7. An I/O control system as set forth in claim 6 wherein said means for disabling said control counter further comprises a setable count hold flip-flop coupled to said control counter.

8. An I/O control system as set forth in claim 7 wherein said means for disabling said control counter further includes an OR gate having all J-Bus transfer requests coupled to said OR gate as inputs.

9. An I/O control system as set forth in claim 7 which further includes,
   AND gating means coupled to the output of said count hole flip-flop,
   J-Bus transfer initiate flip-flop means coupled to the output of said AND gating means, and
   first comparison gating means for resolving access conflicts between said data bus and said J-Bus coupled to an input of said AND gating means whereby setting of said J-Bus transfer initiate flip-flop will be delayed until said access conflicts are resolved.

10. An I/O control system as set forth in claim 9 wherein the output of said J-Bus transfer initiate flip-flop means is coupled to J-Transfer signal gating means for effecting J-Bus data transfer between said buffers.

11. An I/O control system as set forth in claim 10 wherein said J-Transfer gating means further includes a second input coupled to the output of second comparison gating means whereby access conflicts between said main bus and said J-Bus and said data bus for selected buffers are resolved.

12. An I/O control system as set forth in claim 11 wherein said access conflicts determined by said second comparison gating means are effected by blocking said J-Transfer signal gating means and suspending J-Bus data transfers between said buffers for the duration of said access conflicts.

13. An I/O control system as set forth in claim 10 wherein the output of said J-Transfer signal gating means is coupled to a transfer word counter for decrementing the word count after the transfer of each word between said buffers.

14. An I/O control system as set forth in claim 13 which further includes a counter decoder coupled to said transfer word counter for initialing setting a predetermined number of words to be transferred between said buffers during the J-Bus data transfer operation sequence.

15. An I/O control system as set forth in claim 13 which further includes a NAND gate coupled to the output of said transfer word counter for detecting when said transfer word counter reaches the count of 0.

16. An I/O control system as set forth in claim 15 wherein the output of said NAND gate comprises a 0 count signal coupled to said AND gating means and said J-Bus transfer/initiate flip-flop means for resetting said J-Bus transfer initiate flip-flop means and terminating transfer of data on said J-Bus.

17. An I/O control system as set forth in claim 16 which further includes and N count flip-flop coupled to said 0 count signal for generating an N count signal,
   said N count signal being coupled to the reset side of said count whole flip-flop and said count whole flip-flop output being coupled to said control counter for enabling said control counter to step to the next time slot count.

18. An I/O control system as set forth in claim 2 wherein said controllable time slot generator provides a plurality of individual unique time slot windows for selecting channel modules and further includes,
  means for receiving data transfer requests comprising priority flip-flop means for alternately enabling one of two said channel module requests to respond to a channel selection signal.

19. An I/O control system as set forth in claim 18 which further includes sequencer gating means coupled to the output of said priority flip-flop means for detecting time slots that were alternately disabled by said priority flip-flop, and
  micro sequencer control means coupled to said sequence gating means for enabling micro sequence operations intermediate J-Bus transfer control operations.

20. An I/O control system as set forth in claim 19 which further includes sequencer buffer storage means coupled to said J-Bus for receiving sequencer control commands from said staging buffers.

* * * * *